Patented May 15, 1934

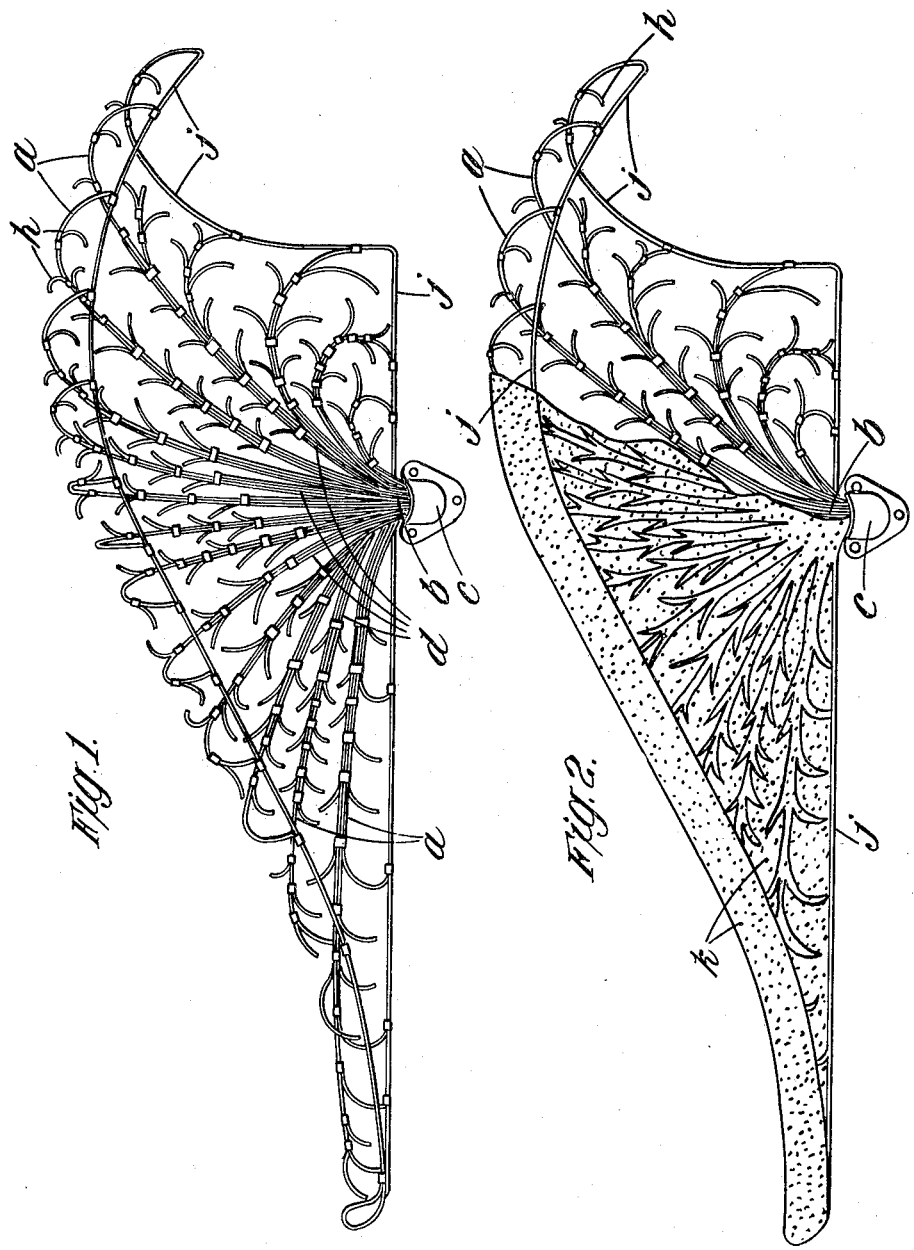

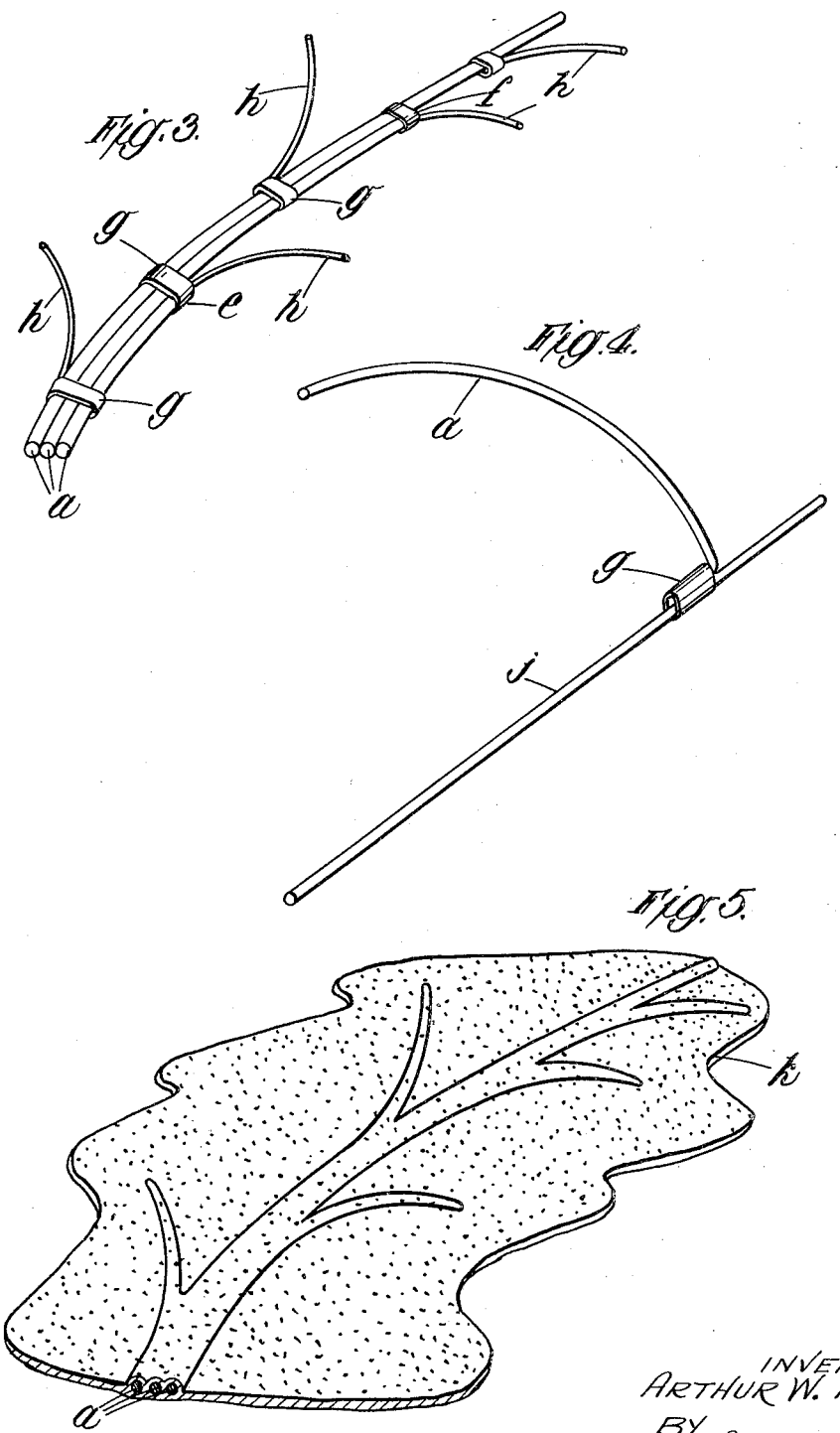

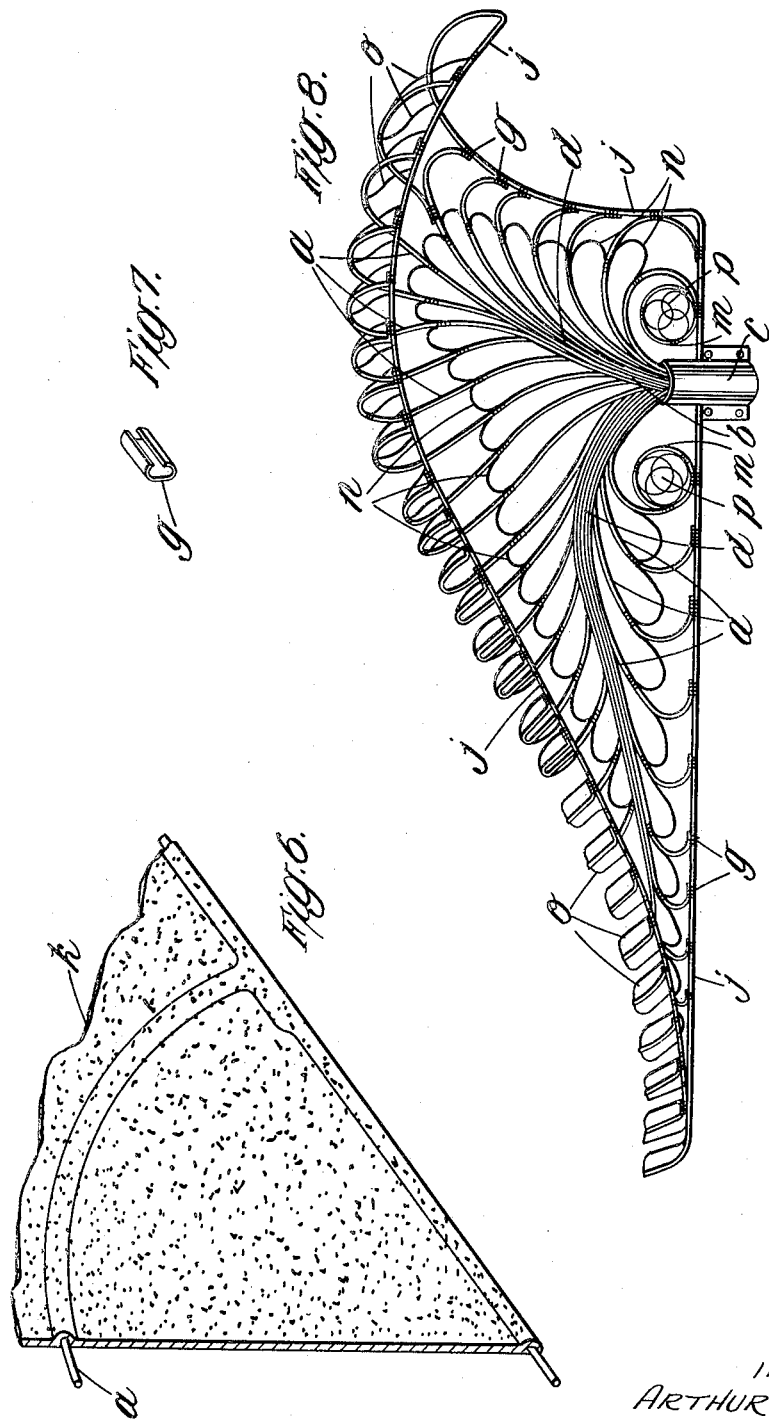

1,959,037

UNITED STATES PATENT OFFICE 1,959,037

FLEXIBLE OR INDESTRUCTIBLE WING OR MUDGUARD FOR MOTOR VEHICLES, CYCLES, AND THE LIKE

Arthur Wilfred Ray, Leigh-on-Sea, England

Application November 29, 1933, Serial No. 700,281
In Great Britain December 5, 1932

15 Claims. (Cl. 280—152)

This invention relates to a mudguard for motor vehicles, cycles and the like, consisting of a metal reinforcement in combination with a cover of India rubber or similar pliable material, and has for its object an improved form of reinforcement for that purpose.

According to the present invention, the reinforcement for such a wing or mudguard is constituted by a relatively thick, strong stem from which spring comparatively thinner weaker parts, which in turn split up into thinner weaker parts and so on, the parts spreading out after the fashion of the branches of a tree or the veins of a leaf, so as to extend throughout so much of the wing or mudguard as may be desired.

Such a reinforcement may be formed from stranded hardened wires twisted into the form of a cable to constitute the stem and being gradually untwisted and spread out so that the ends of the wires present the weakest and most flexible parts, and if desired, such twisted wires may be compressed collectively to present a rectangular cross-section, and in some cases the wires may be bunched together instead of being twisted.

Alternatively, the reinforcement may be of laminar construction, the laminæ being stamped from sheet steel or the like and being of progressive length, or it may be solid and moulded or stamped to the required configuration, or part may be laminar or solid and part of wire, e. g. the stem may be moulded and formed with a socket into which the wire may be fitted.

The stem of the reinforcement would usually be secured, at or towards the inner side of the wing or mudguard, e. g. to the chassis, and if desired the weakest parts of the reinforcement may pass over or be attached to a coiled spring or like flexible element to constitute a beading at the edge of the wing or mudguard.

Two or more reinforcements may be disposed in a wing or mudguard according to its shape and size.

In some cases a supporting stay or tapering cross section may be introduced, such stay springing from the junction of the wing or mudguard and the adjacent running board and extending longitudinally of said wing or mudguard and centrally over the wheel to carry the weight of the wing or mudguard and the parts of the reinforcement may rest on or be secured to said stay.

If canvas or the like is to be employed in the construction of the improved wing or mudguard it may be necessary to provide flat metal plates from which tongues are struck, to secure the canvas or the like and, if desired, the plates, to the reinforcement, or the elements may be bound with metal tape, where required, leaving pointed ends which would pass through the canvas or the like and thus secure it. The reinforcement may be embedded in the India rubber or similar pliable material or it may be arranged at the underside thereof.

A simple form of the invention is illustrated diagrammatically and by way of example in the accompanying drawings in which Figure 1 is a side elevation of the improved reinforcement, Figure 2 is a similar view showing a part of the India rubber covering, Figures 3 and 4 are fragmentary perspective views on a larger scale showing how parts of the reinforcement are constituted, whilst Figures 5 and 6 are similar views from the underside showing the reinforcement embedded in India rubber; Figure 7 is a perspective detail view and Figure 8 is a view similar to Figure 1 but showing a modified form of reinforcement.

As shown in Figures 1 to 7, the reinforcement is constituted mainly by a plurality of hardened wires $a$ . . . (which may be covered individually with India rubber like insulated electric wires, or they may be bound with India rubber tape), bunched together as at $b$ to form a stem and secured, e. g. by brazing, in a socket $c$ adapted to be bolted or otherwise secured to the chassis (not shown) of the car. The stem $b$ splits into a plurality of thinner stems $d$ . . ., each constituted by a fraction of the number of wires in the stem $b$ and at parts thereof more and more remote from the stem $b$ individual wires split off, while others are cut short as at the points $e$ and $f$, Figure 3, the arrangement being somewhat similar to the branches of a tree or the veins of a leaf. The wires constituting the stems $d$ . . . are held together by clips $g$ . . . (Figure 3) which may be spot welded in position and may also serve to attach to said stems short laterally spreading sprigs of thinner wire such as $h$. The sprigs $h$ . . . on adjacent stems may alternate with one another so as to reinforce the gaps between adjacent stems $d$. One wire $a$ of each stem $d$ extends to an edge of the wing or mudguard where it is bent to lie alongside a beading wire $j$ to which it may be secured by a clip $g$ as shown in Figure 4; Figure 7 shows a clip before it is placed in position.

The reinforcement so constructed is covered with India rubber $k$ as shown in Figures 2, 5 and 6 from which it is to be observed that the upper surface of the wing or mudguard is smooth, the inequalities resulting from the covering of the reinforcement being presented at the underside.

Figure 8 shows a modified form of reinforcement in which the wires a . . . are bunched together as at b to form a stem and secured, e. g. by brazing, in a socket c as before, the stem b splitting into a plurality of thinner stems d . . . from which each wire a extends, fanwise and following a suitably curved line, to the beading wire j to which it is secured by a clip g. Those wires a adjacent to the stem b are not only secured to the beading wire j but are also bent to present circles m partially to fill the gaps at those parts. Intermediately of their length the gaps between adjacent wires a are bridged by loops of thin wire as at n and similar loops o . . . are formed adjacent the junctions of said wires with the beading wire j whilst circles of thin wire p are arranged within the circles m m.

If desired a metal bar, not shown, may be secured to the beading wire j (before the rubber covering k is applied) at that edge which is to be secured to the chassis, in the case of a front wing, or to the body, if necessary, in the case of a rear wing.

I claim:—

1. A wing or mudguard having a metal reinforcement disposed within India rubber or similar pliable material said reinforcement being constituted by a relatively thick, strong stem from which spring comparatively thinner weak parts, which in turn split up into thinner weak parts, and so on, the parts spreading out after the fashion of the branches of a tree or the veins of a leaf.

2. A wing or mudguard as claimed in claim 1, wherein the reinforcement is constituted by wires twisted into the form of a cable to form the main stem, said stem being gradually split up into weaker spreading portions the ends of the wires presenting the weakest and most flexible parts.

3. A wing or mudguard as claimed in claim 1, wherein the reinforcement is constituted by wires bunched together to form the main stem, said stem being gradually split up into weaker spreading portions the ends of the wires presenting the weakest and most flexible parts.

4. A wing or mudguard as claimed in claim 1, wherein the reinforcement is constituted by wires twisted into the form of a cable to form the main stem, said stem being gradually split up into weaker spreading portions the ends of the wires presenting the weakest and most flexible parts, some of the wires, at parts thereof more and more remote from the main stem, being clipped together, and some of the wires being cut short and reducing the strength of the stems.

5. A wing or mudguard as claimed in claim 1, wherein the reinforcement is constituted by wires bunched together to form the main stem, said stem being gradually split up into weaker spreading portions the ends of the wires presenting the weakest and most flexible parts, some of the wires, at parts thereof more and more remote from the main stem, being clipped together, and some of the wires being cut short and reducing the strength of the stems.

6. A wing or mudguard as claimed in claim 1, wherein the reinforcement is constituted by wires twisted into the form of a cable to form the main stem, said stem being gradually split up into weaker spreading portions the ends of the wires presenting the weakest and most flexible parts, one wire of each stem extending to an edge of the wing or mudguard where it is secured to a beading wire.

7. A wing or mudguard as claimed in claim 1, wherein the reinforcement is constituted by wires bunched together to form the main stem, said stem being gradually split up into weaker spreading portions the ends of the wires presenting the weakest and most flexible parts, one wire of each stem extending to an edge of the wing or mudguard where it is secured to a beading wire.

8. A wing or mudguard as claimed in claim 1, wherein the reinforcement is constituted by wires twisted into the form of a cable to form the main stem, said stem being gradually split up into weaker spreading portions the ends of the wires presenting the weakest and most flexible parts, some of the wires, at parts thereof more and more remote from the main stem, being clipped together, and some of the wires being cut short and reducing the strength of the stems, one wire of each stem extending to an edge of the wing or mudguard where it is secured to a beading wire.

9. A wing or mudguard as claimed in claim 1, wherein the reinforcement is constituted by wires bunched together to form the main stem, said stem being gradually split up into weaker spreading portions the ends of the wires presenting the weakest and most flexible parts, some of the wires, at parts thereof more and more remote from the main stem, being clipped together, and some of the wires being cut short and reducing the strength of the stems, one wire of each stem extending to an edge of the wing or mudguard where it is secured to a beading wire.

10. A wing or mudguard as claimed in claim 1, wherein the reinforcement is constituted by wires twisted into the form of a cable to form the main stem, said stem being gradually split up into weaker spreading portions the ends of the wires presenting the weakest and most flexible parts, some of the wires, at parts thereof more and more remote from the main stem, being clipped together, and some of the wires being cut short and reducing the strength of the stems, and laterally spreading sprigs or loops of weaker wire secured to the stems or individual wires and, in some cases, to the beading wire.

11. A wing or mudguard as claimed in claim 1, wherein the reinforcement is constituted by wires bunched together to form the main stem, said stem being gradually split up into weaker spreading portions the ends of the wires presenting the weakest and most flexible parts, some of the wires, at parts thereof more and more remote from the main stem, being clipped together, and some of the wires being cut short and reducing the strength of the stems, and laterally spreading sprigs or loops of weaker wire secured to the stems or individual wires, and, in some cases, to the beading wire.

12. A wing or mudguard as claimed in claim 1, wherein the reinforcement is constituted by wires twisted into the form of a cable to form the main stem, said stem being gradually split up into weaker spreading portions the ends of the wires presenting the weakest and most flexible parts, one wire of each stem extending to an edge of the wing or mudguard where it is secured to a beading wire and laterally spreading sprigs or loops of weaker wire secured to the stems or individual wires, and, in some cases, to the beading wire.

13. A wing or mudguard as claimed in claim 1, wherein the reinforcement is constituted by wires bunched together to form the main stem, said stem being gradually split up into weaker spreading portions the ends of the wires presenting the weakest and most flexible parts, one wire of each stem extending to an edge of the wing or mudguard where it is secured to a beading wire, and laterally spreading sprigs or loops of weaker wire secured to the stems or individual wires, and, in some cases, to the beading wire.

14. A wing or mudguard as claimed in claim 1, wherein the reinforcement is constituted by wires twisted into the form of a cable to form the main stem, said stem being gradually split up into weaker spreading portions the ends of the wires presenting the weakest and most flexible parts, some of the wires, at parts thereof more and more remote from the main stem, being clipped together, and some of the wires being cut short and reducing the strength of the stems, one wire of each stem extending to an edge of the wing or mudguard where it is secured to a beading wire, and laterally spreading sprigs or loops of weaker wire secured to the stems or individual wires, and, in some cases, to the beading wire.

15. A wing or mudguard as claimed in claim 1, wherein the reinforcement is constituted by wires bunched together to form the main stem, said stem being gradually split up into weaker spreading portions the ends of the wires presenting the weakest and most flexible parts, some of the wires, at parts thereof more and more remote from the main stem, being clipped together, and some of the wires being cut short and reducing the strength of the stem, one wire of each stem extending to an edge of the wing or mudguard where it is secured to a beading wire, and laterally spreading sprigs or loops of weaker wire secured to the stems of individual wires, and, in some cases, to the beading wire.

ARTHUR WILFRED RAY.